US006912570B1

(12) United States Patent
Leavy

(10) Patent No.: US 6,912,570 B1
(45) Date of Patent: Jun. 28, 2005

(54) SELF MODIFYING STATE GRAPHS FOR QUALITY OF SERVICE CLASSIFICATION

(75) Inventor: Nicholas Leavy, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/439,116

(22) Filed: Nov. 12, 1999

(51) Int. Cl.[7] ............................................ G06F 15/173
(52) U.S. Cl. ...................... 709/224; 345/440; 370/474
(58) Field of Search ............................... 709/224, 221, 709/223, 225; 370/474, 252; 379/229; 707/4; 703/20; 345/440, 769; 714/39; 340/825; 702/185, 119, 122, 20

(56) References Cited

U.S. PATENT DOCUMENTS

| | | | | | |
|---|---|---|---|---|---|
| 4,951,195 | A | * | 8/1990 | Fogg, Jr. et al. ............... | 703/20 |
| 5,586,281 | A | * | 12/1996 | Mitama et al. ................. | 711/5 |
| 5,768,498 | A | * | 6/1998 | Boigelot et al. ............... | 714/39 |
| 5,917,499 | A | * | 6/1999 | Jancke et al. ................. | 345/440 |
| 6,021,437 | A | * | 2/2000 | Chen et al. .................... | 709/224 |
| 6,141,686 | A | * | 10/2000 | Jackowski et al. ............ | 709/224 |
| 6,148,336 | A | * | 11/2000 | Thomas et al. ............... | 709/224 |
| 6,167,445 | A | * | 12/2000 | Gai et al. ..................... | 709/223 |
| 6,172,990 | B1 | * | 1/2001 | Deb et al. ..................... | 370/474 |
| 6,219,706 | B1 | * | 4/2001 | Fan et al. ..................... | 709/225 |
| 6,295,532 | B1 | * | 9/2001 | Hawkinson ..................... | 707/4 |
| 6,304,900 | B1 | * | 10/2001 | Cromer et al. ............... | 709/221 |
| 6,324,279 | B1 | * | 11/2001 | Kalmanek, Jr. et al. ..... | 379/229 |
| 6,430,617 | B1 | * | 8/2002 | Britt et al. .................... | 709/224 |
| 6,529,217 | B1 | * | 3/2003 | Maguire, III et al. ........ | 345/769 |

OTHER PUBLICATIONS

Norris et al; Efficient Verification of Symmetric Concurrent Systems—Ip, Dill (1993); sprout.stanford.edu/ip/sym2.ps.gz.*
Policy Framework. www.ietf.org/proceedings/99mar/44th–99mar–ietf–45.html.*

* cited by examiner

*Primary Examiner*—Thong Vu

(57) ABSTRACT

A method and intermediate device for dynamically modifying a stateful inspection of data. In one embodiment, the present invention is comprised of an intermediate device such as, for example, a router. The intermediate device is adapted to perform a stateful inspection of data passing therethrough. In one approach, the intermediate device performs the stateful inspection by inspecting the data to determine state information for the data. Next, the intermediate device modifies a state graph used to perform the stateful inspection of the data based upon the state information found during the aforementioned inspection. The intermediate device then utilizes the modified state graph to perform continued stateful inspection of the data. In so doing, the present invention enables an enhanced use of Quality of Service (QoS) classification based upon the high level application of the data. The present invention further provides a classification engine which can readily be adapted to new protocols.

20 Claims, 3 Drawing Sheets

100

SELF MODIFYING STATE GRAPHS FOR QUALITY OF SERVICE CLASSIFICATION

TECHNICAL FIELD

The present invention generally pertains to the field of computer networking. More particularly, the present invention is related to Quality of Service (QoS) classification.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange data, files, share information stored on a common database, pool resources, and communicate via e-mail and via video teleconferencing.

When sharing such information via, for example, a network, it is often desired to prioritize the transmission of the data. As an example, it is common to have numerous types of data transmitted to, for example, a client PC (personal computer). Some of the data may not be able to tolerate long periods of latency (e.g. real-time video data). That is, if the real-time video data is delayed in being transmitted to the client PC, the client PC will experience a degradation in the video images produced thereon. On the other hand, if the transmission of, for example, a simple data file is delayed, the client PC will not be severely compromised. Hence, when attempting to transmit both real-time video data and a simple data file to a client PC, it is prudent to allocate a higher priority to the real-time video data. Such prioritization is typically accomplished by performing a stateful inspection of the data being transmitted. The stateful inspection uses state information to provide classification information of the data. This classification information is then used to prioritize the data using a method commonly referred as Quality of Service (QoS) classification. The stateful inspection is commonly implemented within and performed by, for example, an intermediate device through which the data is transmitted. Unfortunately, conventional stateful inspection methods have significant drawbacks and disadvantages associated therewith.

As an example of one drawback, conventional stateful inspection methods and intermediate devices are often developed to accommodate specific types of data. However, such conventional approach does not lend itself to an expedient and efficient analysis of newly introduced types of data.

As yet another disadvantage, conventional stateful inspection methods and intermediate devices are often developed to accommodate specific protocols. For example, a conventional stateful inspection method or intermediate device may have been developed to recognize and analyze data pertaining to a real-time audio data transmission protocol. By recognizing the real-time audio data transmission protocol, a conventional stateful inspection method could accommodate applying QoS classification to the real-time audio data. In such an approach, the real-time audio data could be assigned the highest priority due to its latency intolerance. However, if a new data transmission protocol is developed (e.g. real-time video), existing conventional stateful inspection methods may not even recognize, or be able to analyze, the protocol and/or the data transmitted according to the new protocol. Furthermore, data transmitted according the new protocol may have even less latency tolerance than all other data. That is, the real-time video data of the "new protocol" may require an even higher priority than the real-time audio data of the "old protocol". Thus, with conventional stateful inspection methods or intermediate devices it may not even be possible to use QoS classification methods to readily assign a higher priority (or even any priority value) to the data of the new protocol.

Thus, a need exists for a method and intermediate device for providing a stateful inspection of data wherein the method and intermediate device are not limited by the inflexible nature of conventional stateful inspection approaches. Still another need exists for a method and intermediate device which meet the above-listed need and which enable Quality of Service (QoS) classification even for future protocols. Yet another need exists for a method and intermediate device which meet the above-listed needs and which enable Quality of Service (QoS) classification based upon the high level application of the data even for future protocols.

DISCLOSURE OF THE INVENTION

The present invention provides a method and intermediate device for providing a stateful inspection of data wherein the method and intermediate device are not limited by the inflexible nature of conventional stateful inspection approaches. The present invention further provides a method and intermediate device which achieve the above-listed accomplishment and which enable Quality of Service (QoS) classification even for future protocols. The present invention also provides a method and intermediate device which achieve the above-listed accomplishments and which enable Quality of Service (QoS) classification based upon the high level application of the data even for future protocols.

Specifically, in one embodiment, the present invention is comprised of an intermediate device such as, for example, a router. The intermediate device is adapted to perform a stateful inspection of data passing therethrough. In one embodiment, the data is comprised, for example, of packet data. In one approach, the intermediate device performs the stateful inspection by inspecting the data to determine state information for the data. Next, the intermediate device modifies a state graph used to perform the stateful inspection of the data based upon the state information found during the aforementioned inspection. The intermediate device then utilizes the modified state graph to perform continued stateful inspection of the data. In so doing, the present invention enables an enhanced use of Quality of Service (QoS) classification based upon the high level application of the data. The present invention further provides a classification engine which can readily be adapted to new protocols.

In another embodiment, the present invention includes the features of the above-described embodiment, and further recites that the state graph is implemented in a high level programming language. More specifically, in one particular embodiment, the present method for dynamically modifying a stateful inspection of data is implemented in a Protocol Description Language (PDL).

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
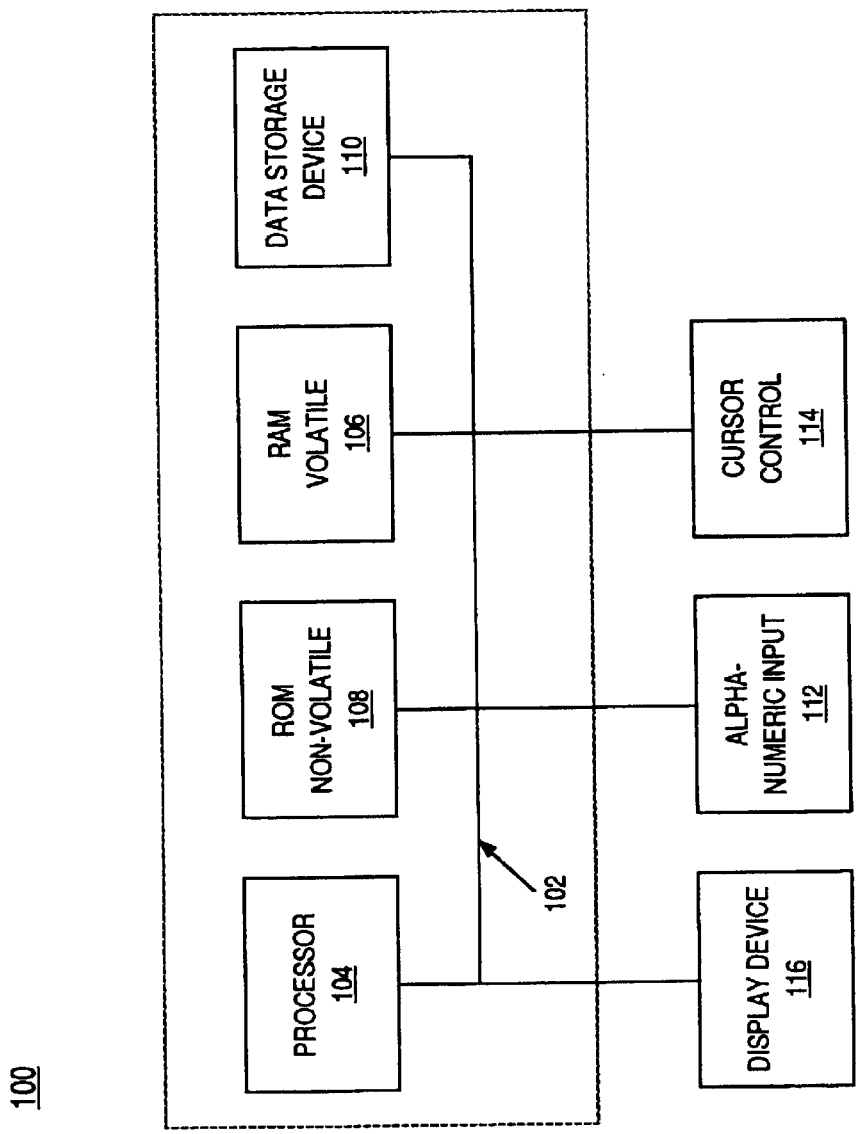
FIG. 1 is a schematic diagram of an exemplary computer system used to perform steps of the present method for dynamically modifying a state graph for Quality of Service classification in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "inspecting", "modifying", "utilizing", "assigning" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Method for Dynamically Modifying a State Graph With reference now to FIG. 1, portions of the present method and system for dynamically modifying a state graph are comprised of computer-readable and computer-executable instructions which reside, for example, in computer-usable media of a computer system. FIG. 1 illustrates an exemplary computer system 100 used to perform the method for dynamically modifying a state graph in accordance with one embodiment of the present invention. It is appreciated that system 100 of FIG. 1 is exemplary only and that the present invention can operate within a number of different computer systems including general purpose networked computer systems, embedded computer systems, and stand alone computer systems. For purposes of the present application, system 100 is comprised, at least in part, of the components residing within an intermediate device used to perform the method for dynamically modifying a state graph.

System 100 of FIG. 1 includes an address/data bus 102 for communicating information, and a processor 104 coupled to bus 102 for processing information and instructions. Processor 104 may be an 80×86-family microprocessor. System 100 also incudes data storage features such as a computer usable volatile memory 106, e.g. random access memory (RAM), coupled to bus 102 for storing information and instructions for processor 104, computer usable non-volatile memory 108, e.g. read only memory (ROM), coupled to bus 102 for storing static information and instructions for processor 104, and a data storage device 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to processor 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the method and system for dynamically modifying a state graph in accordance with embodiments of the present invention is found below.

Figure 2:
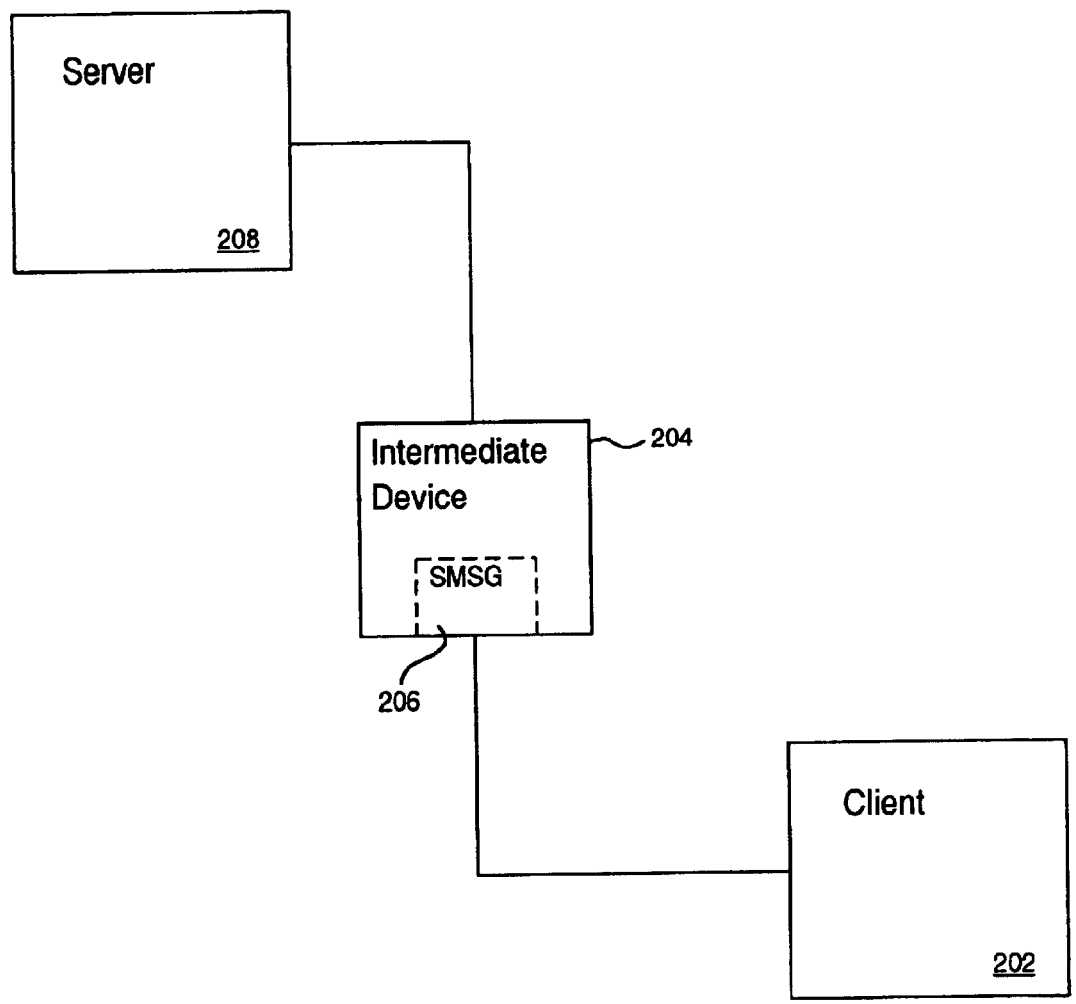
FIG. 2 is a schematic diagram of a simplified client/server network architecture including an intermediate device in accordance with one embodiment of the present invention.

Referring next to FIG. 2, a block diagram 200 representing a simplified client/server network architecture including an intermediate device in accordance with one embodiment of the present invention is shown. As shown in FIG. 2, a client 202 such as, for example, a personal computer (PC) is coupled to an intermediate device 204. In the present embodiment, intermediate device 204 is a router. Specifically, in one embodiment intermediate device 204 is Cisco 7100 Series VPN Router, available from Cisco Systems, Inc. of San Jose, Calif. However, the present invention is also well suited to an embodiment in which intermediate device is a switch, a concentrator, a network address translator (NAT), or any of various other types of intermediate devices and/or network devices.

Referring still to block diagram 200 of FIG. 2, intermediate device 204 of the present embodiment includes a self modifying state graph (SMSG) 206 for performing a stateful inspection of data passing through intermediate device 204. SMSG 206 of the present embodiment is comprised of software which runs, for example, on a processor, ASIC (application specific integrated circuit), or other similar device existing within intermediate 204. More specifically, in one embodiment SMSG is implemented in a high level programming language such as, for example, a Protocol Description Language (PDL). Although such an implementation is recited in the present embodiment, the present invention is also well suited to an embodiment in which SMSG 206 is implemented in hardware or firmware within intermediate device 204. A detailed description of the operation of SMSG 206 will be provided below in conjunction with the discussion of FIG. 3.

With reference still to block diagram 200 of FIG. 2, client 202 is also coupled via intermediate device 204 to a server 208. Thus, data passing between server 208 and client 202 can be intercepted and inspected by intermediate device 204 in manner as will be described below in detail. As a result, SMSG 206 will have access, if desired, to data passing between client 202 and server 208.

Although a simplified schematic diagram 200 is shown in FIG. 2 for purposes of clarity and explanation, it will be understood that present invention is well suited to operation in a substantially more complex network environment including, for example, multiple clients, multiple servers, multiple intermediate devices, the internet, local area networks (LANs), wide area networks (WANs), various other network devices, and the like.

Figure 3:
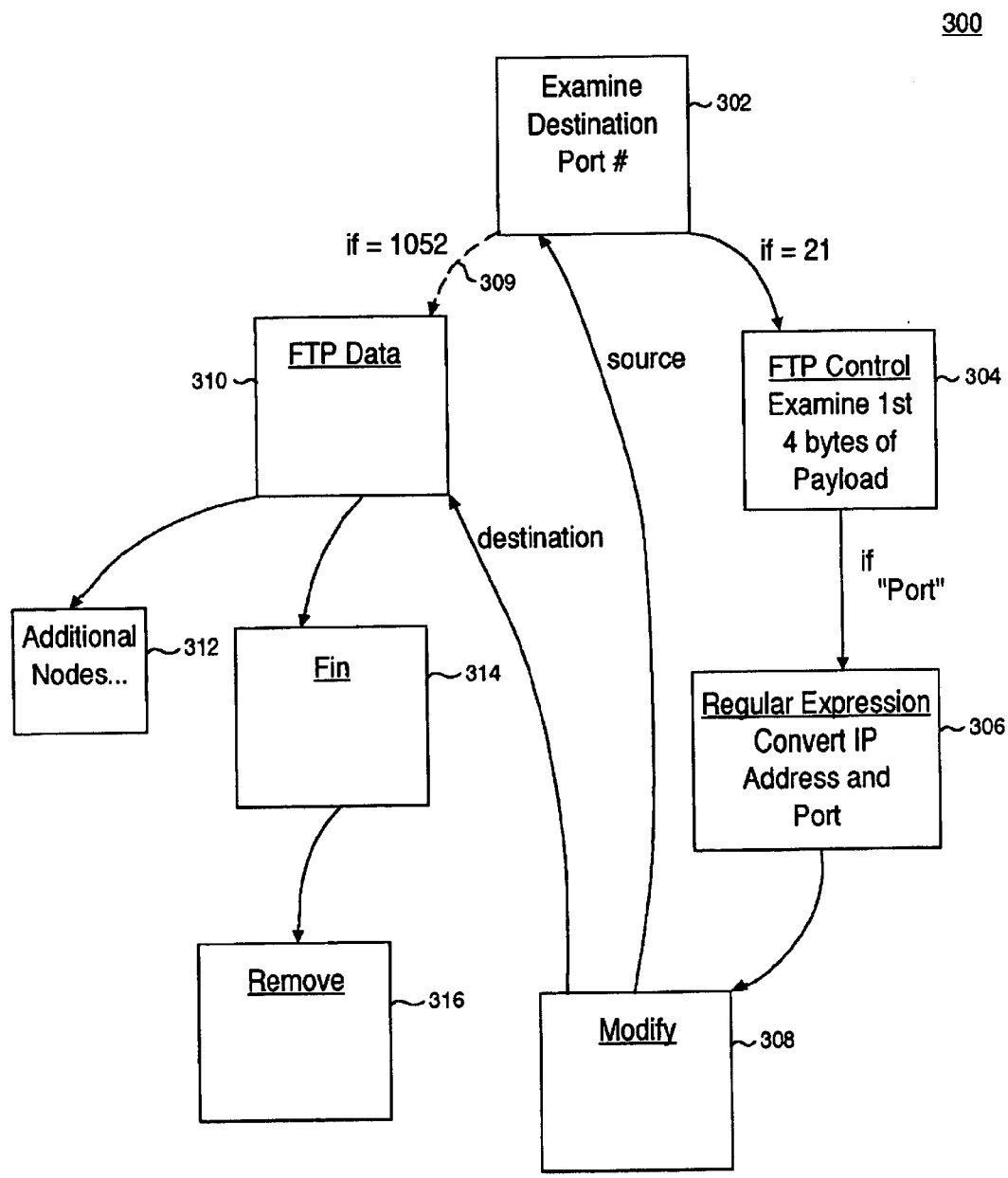
FIG. 3 is a portion of a self-modifying state graph showing steps performed in one example of the present method for dynamically modifying a state graph for Quality of Service classification in accordance with one embodiment of the present claimed invention.

General Description of the Present Method for Dynamically Modifying a State Graph With reference next to FIG. 3, an illustrative portion 300 of one type of a self modifying state graph which would comprise SMSG 206 of FIG. 2 is shown. State graph portion 300 includes exemplary steps and nodes used by the present embodiment. Nodes 302–316 of FIG. 3 recite an illustrative example of one type of dynamic self-modification of a portion of state graph achieved by the present embodiment.

It should be understood, however, that the present invention is capable of performing various modifications of various types of state graph steps and nodes to enable efficient and precise stateful inspections of data passing through intermediate device 204. For purposes of brevity and clarity only one example of a dynamic self-modification of a state graph is given herein. Specifically, state graph portion 300 of FIG. 3 recites the steps and nodes used to classify FTP (file transfer protocol) data. State graph portion 300 includes processes of the present invention which, in one embodiment, are carried out by a processor under the control of computer-readable and computer-executable instructions. Additionally, it should be understood that the following discussion provides a didactic example of one embodiment of the present invention. It should be understood that various other embodiments of the present invention may include substantially more complex state graphs and nodes.

As mentioned above, for purposes of the present application, system 100 is comprised, at least in part, of the components residing within an intermediate device used to perform the method for dynamically modifying a state graph. The computer-readable and computer-executable instructions reside, for example, in data storage features such as computer usable volatile memory 106 and/or computer usable non-volatile memory 108 of FIG. 1. The computer-readable and computer-executable instructions are used to control or operate in conjunction with, for example, processor 104 of FIG. 1. Although specific steps and nodes are disclosed in state graph portion 300 of FIG. 3, such steps and nodes are exemplary. That is, the present invention is well suited to having various other steps or nodes or to having variations of the steps or nodes recited in FIG. 3. Additionally, the steps and nodes of FIG. 3 will be described in conjunction with the simplified schematic diagram 200 of FIG. 2.

State graph portion 300 of FIG. 3 begins with node 302. At node 302, in the present method of dynamically modifying a state graph, intermediate device 204 inspects data passing therethrough to determine state information of the data. Specifically, at node 302 the present embodiment examines the destination port number for packet of data which client 202 has requested from server 208. Although packet data is specifically mentioned in the present embodiment, the present invention is also well suited to an embodiment in which the data is other than packet data.

Referring still to node 302, in one embodiment intermediate device 204 inspects a negotiation packet sent between client 202 and server 208. For purposes of the present discussion it is assumed that client 202 is requesting an FTP (file transfer protocol) data file from server 208. After performing the step of node 302, intermediate device is now aware of the destination port number for the packet data to be sent from client 202 to server 208. Assuming that the destination port number is, as an example, 21, which pertains to FTP traffic, state graph portion 300 of the present embodiment proceeds to node 304. If the destination port number is other than 21, the state graph of the present embodiment would proceed to a certain one of various other nodes (not shown for purposes of clarity).

At FTP control node 304, the present embodiment inspects the first 4 bytes of the payload of the data packet being sent from server 208 to client 202. If the first 4 bytes of the payload represent the word "port" in ASCII (American National Standard Code for Information Interchange) format, the present embodiment proceeds to node 306. If the first 4 bytes of the payload represent other than the word "port" in ASCII format, the state graph of the present embodiment would proceed to a certain one of various other nodes (not shown for purposes of clarity).

At Regular Expression node 306, the present embodiment converts the IP (internet protocol) address and determines the port number to which the FTP data is to be sent. In the present embodiment the port number to which the FTP data is to be sent is determined to be, as an example, 1052. Once this state information is determined, the present embodiment proceeds to modify node 308.

At Modify node 308 of state graph portion 300, the present embodiment modifies the state graph such that data packets having a destination port number of 1052 proceed from node 302 (i.e. the new source node) directly to FTP data node 310 (i.e. the new destination node) as indicated by dotted line 309. In so doing, the present embodiment performs a dynamic self-modification of the state graph. Hence, the present embodiment modifies a state graph used to perform a stateful inspection of data based upon previously determined state information of the data.

At FTP data node 310, the present embodiment will perform the appropriate steps for handling FTP data. That is, the present embodiment then utilizes the modified state graph to perform continued stateful inspection of the data. Moreover, by recognizing that data packets having a destination port of 1052 are FTP data packets, the present embodiment enables Quality of Service (QoS) classification to be assigned to FTP packet data. Thus, unlike some prior art approaches which would not even recognize the FTP traffic, the present embodiment recognizes the FTP traffic, determines state information for the FTP traffic, performs a dynamic self-modification of the state graph, continues to utilize the modified state graph to perform stateful inspections, and enables QoS classification of the data based on the previously determined state information.

Referring still to state graph portion 300, the present embodiment is well suited to having various additional nodes 312 coupled to FTP data node 310 such that various well known FTP handling steps can be performed.

Referring now to Fin node 314, the present embodiment continues to inspect packets having a destination port of 1052 until a Fin packet is recognized. At that point, the FTP transfer between server 208 and client 202 is complete. Hence, the present embodiment proceeds to Remove node 316 and the modification previously made to the state graph can be removed.

At Remove node 316, the present embodiment removes the modification made at step 308 to the state graph. Thus, not only does the present embodiment dynamically self-modify the state graph, but, the present embodiment also dynamically returns the state graph to its original state.

As mentioned above, for purposes of brevity and clarity only one example of a dynamic self-modification of a state graph is given herein. Specifically, state graph portion 300 of FIG. 3 recites the steps and nodes used to classify FTP (file transfer protocol) data. It should be understood, however, that the present invention is capable of performing various modifications of various types of state graph steps and nodes to enable efficient and precise stateful inspections of data passing through intermediate device 204. For example, the present invention is well suited to an embodiment in which the state graph dynamically self-modifies itself to accommodate data, such as but not limited to, HTTP (hypertext transfer protocol) traffic, audio/video data, and various other types of data. Furthermore, by recognizing the various data types, and by dynamically self-modifying itself, the present embodiment enables stateful inspections based upon the high level application of the data. That is, the stateful inspections made in accordance with one embodiment of the present invention look at the layer 7 information of the data. As a result, in one embodiment, the present invention enables assigning of Quality of Service classification based upon the highest level application for the data.

As yet another benefit, the present invention increases QoS applicability. That is, the present invention is able to recognize various data types, and determine state information for those various data types such that QoS classifications can be employed. Additionally, by dynamically self-modifying the state graph used to perform the stateful inspection, the present invention is not limited to a inflexible inspection scheme. Hence, unlike some prior art approaches, SMSG 206 of FIG. 2 can be altered on-the-fly to accommodate various types of data. In addition to altering the state graph to handle various data types, the present invention can also be updated with new nodes/steps to accommodate new protocols. Thus, when a new protocol is developed, legacy intermediate devices can receive an upgrade for SMSG 206. In so doing, SMSG 206 is able to statefully inspect data handled according to the new protocol, and the upgraded SMSG will enable QoS classification based upon the determined state information for the data of the new protocol.

Thus, the present invention provides a method and intermediate device for providing a stateful inspection of data wherein the method and intermediate device are not limited by the inflexible nature of conventional stateful inspection approaches. The present invention further provides a method and intermediate device which achieve the above-listed accomplishment and which enable Quality of Service (QoS) classification even for future protocols. The present invention also provides a method and intermediate device which achieve the above-listed accomplishments and which enable Quality of Service (QoS) classification based upon the high level application of the data even for future protocols.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. A method for dynamically modifying a stateful inspection of FTP classified data being transmitted over a network, said method comprising the steps of:
  a) dynamically inspecting said data to determine state information for said data; and
  b) modifying a state graph used in performing said stateful inspection of said data based upon said state information determined in step a) for said data; and
  c) utilizing said modified state graph to perform continued stateful inspection by means of an intermediate device of said data.

2. The method for dynamically modifying a stateful, inspection of data as recited in claim 1 wherein said state graph is implemented in a high level programming language.

3. The method for dynamically modifying a stateful inspection of data as recited in claim 2 wherein said high level programming language is a Protocol Description Language (PDL).

4. The method for dynamically modifying a stateful inspection of data as recited in claim 1 wherein said data is packet data.

5. The method for dynamically modifying a stateful inspection of data as recited in claim 1 further comprising the step of:
   d) assigning Quality of Service (QoS) classification to said data based upon said state information determined in step a) for said data.

6. The method for dynamically modifying a stateful inspection of data as recited in claim 5 wherein said assigning of said Quality of Service classification of step d) is based upon the highest level application for said data.

7. An intermediate device adapted to perform a stateful inspection of FTP classified data passing therethrough, said intermediate device further adapted to perform a method of dynamically modifying said stateful inspection of said data which passes through said intermediate device, said method comprising the steps of:
   a) dynamically inspecting said data to determine state information for said data; and
   b) modifying a state graph used in performing said stateful inspection of said data based upon said state information determined in step a) for said data; and
   c) utilizing said modified state graph to perform continued stateful inspection by means of said intermediate device of said data.

8. The intermediate device of claim 7 wherein said intermediate device is a router.

9. The intermediate device of claim 7 wherein said state graph is implemented in a high level programming language.

10. The intermediate device of claim 9 wherein said high level programming language is a Protocol Description Language (PDL).

11. The intermediate device of claim 7 wherein said data is packet data.

12. The intermediate device of claim 7 wherein said method performed by said intermediate device further comprises the step of:
   assigning Quality of Ser vice (QoS) classfication to said data based upon said state information determined in step a) for said data.

13. The intermediate device of claim 12 wherein step d) of said method performed by said intermediate device further comprises assigning said Quality of Service classification based upon the highest level application for said data.

14. A computer readable medium adapted to be coupled to an intermediate device, said computer readable medium have computer readable code stored thereon for causing said intermediate device to perform a stateful inspection of FTP classified data passing therethrough, said computer readable code stored on said computer readable media further adapted to cause said intermediate device to perform a method of dynamically modifying said stateful inspection of said FTP classified data which passes through said intermediate device, said method comprising the steps of:
   a) dynamically inspecting said data to determine state information for said data; and
   b) modifying a state graph used in performing said stateful inspection of said data based upon said state information determined in step a) for said data; and
   c) utilizing said modified state graph to perform continued stateful inspection by means of said intermediate device of said data.

15. The computer readable medium of claim 14 wherein said computer readable code stored thereon causes an intermediate device comprised of a router to perform said method.

16. The computer readable medium of claim 14 wherein said computer readable code stored thereon causes said intermediate device to perform said method using said state graph wherein said state graph is implemented in a high level programming language.

17. The computer readable medium of claim 16 wherein said computer readable code stored thereon causes said intermediate device to perform said method using said state graph wherein said state graph is implemented in a Protocol Description Language (PDL).

18. The computer readable medium of claim 14 wherein said computer readable code stored thereon causes said intermediate device to perform said method on packet data passing through said intermediate device.

19. The computer readable medium of claim 14 wherein said computer readable code stored thereon causes said intermediate device to further perform the step of:
   c) assigning Quality of Service (QoS) classification to said data based upon said state information determined in step a) for said data.

20. The computer readable medium of claim 14 wherein said computer readable code stored thereon causes said intermediate device to further perform the step of:
   d) assigning Quality of Service (QoS) classification to said data based upon said state information determined in step a) and based upon the highest level application for said data.

* * * * *